United States Patent Office

3,356,660
Patented Dec. 5, 1967

3,356,660
PREVENTING COLOR DEGRADATION IN THE HYDROGENATION OF HYDROCARBON RESINS
Karsten Herbert Moritz and Leonard Joseph Delany, Baton Rouge, La., assignors to Esso Research and Engineering Company, a corporation of Delaware
No Drawing. Filed Sept. 25, 1964, Ser. No. 399,378
3 Claims. (Cl. 260—82)

ABSTRACT OF THE DISCLOSURE

Color degradation of hydrogenated resin is prevented by stripping the resin feed to hydrogenation, prior to preheating, with inert gases such as $N_2$, $H_2$, etc.

---

This invention relates to a method for the hydrogenation of resins from steam-cracked hydrocarbon fractions and more particularly relates to a method for preventing color degradation, during said hydrogention.

It is known to prepare resins from steam-cracked petroleum fractions by Friedel-Crafts polymerization at low temperatures and to hydrogenate the resulting product over a hydrogenation catalyst in the presence of a hydrocarbon solvent. The hydrogenation converts an otherwise highly colored and, thus for many uses, an undesirable product, into a low-colored commercially attractive product. However, it has been found necessary to avoid preheating the feed to hydrogenation and instead to contact it with the hydrogenation catalyst at temperatures below 320° F. in order to avoid color degradation of the feed resins prior to hydrogenation. Such decolorization is undesirable because the higher the feed color, the higher the catalyst activity requirements and the shorter the catalyst life. Accordingly it is standard practice to avoid preheating the resin feed and to use part of the catalyst bed to heat the feed to hydrogenation temperature with resultant loss in catalyst efficiency.

In accordance with the present invention it has now been discovered that the feed can be preheated prior to contacting the catalyst provided the feed and the diluent are stripped with inert gases prior to heating in the presence of the catalyst.

The base resin which is to be hydrogenated in accordance with the present invention is prepared from certain unsaturated petroleum refinery streams which contain various mixtures of acyclic and cyclic olefins and diolefins by contact with a Friedel-Crafts type catalyst under relatively low temperatures, e.g. −150° to +200° F. The hydrocarbon mixtures obtained by steam cracking petroleum oils have been found to be especially useful for this purpose. These distillates are prepared by cracking petroleum fractions such as kerosene, gas oil, naphtha or residua in the presence of large amounts of steam, e.g. 50 to 90 mole percent, at temperatures of approximately 1,000 to 1,600° F. This steam cracking process is well known in the patented art and literature. The cracked liquid fraction ordinarily contains small amounts of cyclopentadiene monomers which are usually at least partially removed by thermal treatment of the fraction to cause dimerization of the cyclodiene. The cyclodienes may be left in the fraction if it is desired. These resins are useful for the preparation of floor tiles, in paints, for varnish manufacture or the like. In general, various steam cracked hydrocarbon streams such as described above and more particularly below may be employed. For example, a resin may be prepared from feed stocks having a relatively wide boiling range, e.g. 10° to 230° C., preferably 20 to 220° C., from which essentially all of the $C_4$ hydrocarbons and lighter hydrocarbons have been removed, although one may also use one or more narrower fractions such as the 40° to 150° C. fraction, the 150° to 230° C. fraction, etc. It is also sometimes advantageous to remove the isoprene from the naphtha. Typical analyses of such a wide steam cracked boiling fraction are shown in the following table:

TABLE I.—STEAM CRACKED NAPHTHA FRACTION BOILING BETWEEN 50° and 450° F.

| Component | Approximate Boiling Range, °C. | Specific Example, Volume Percent | General Range (15-70° C.), Volume Percent |
|---|---|---|---|
| $C_5$ Fraction | 10 to 65 | 31 | 10 to 40 |
| $C_6$-$C_8$ Fraction | 65 to 150 | 64 | 30 to 70 |
| $C_9$-$C_{12}$ Fraction | 150 to 230 | 5 | 0 to 25 |

Although the actual content of various chemical classes of hydrocarbons present may vary somewhat according to the type of crude oil from which the gas-oil fraction is being cracked and according to the steam cracking conditions and fractionating conditions; nevertheless, in general, a desirable, essentially debutanized, steam-cracked naphtha fraction boiling between 50° and 450° F. will have approximately the following range in composition:

Percent by weight
Aromatic hydrocarbons _____ 10 to 50
Olefins _____ 30 to 70
Unreactive paraffins _____ 0 to 5

A typical sample of such a fraction will consist essentially of about 5 to 20 weight percent benzene, about 5 to 15 weight percent toluene, about 0 to 25 weight percent of $C_9$ to $C_{12}$ aromatic hydrocarbons, about 5 to 15 weight percent of cyclodienes, about 10 to 15 weight percent aliphatic diolefins, about 15 to 60 weight percent of monoolefins and about 0 to 5 weight percent unreactive paraffins.

In accordance with the present invention the product resin is dissolved in the selected hydrocarbon solvent and stripped with $N_2$, $H_2$ or any other inert gas prior to preheating and contacting with the hydrogenation catalyst. Alternately, the diluent may be separately stripped prior to dissolving the resin. Although the latter procedure is preferred, it may not always be convenient. Both procedures give superior results as compared to direct hydrogenation without prior stripping. The actual stripping technique will vary depending upon whether the subsequent hydrogenation process is continuous or batch. For stripping the diluent or resin solution to be used as feed to continuous reactor, nitrogen is saturated with heptane in a heptane saturator to avoid stripping heptane from the resin solution. The time of stripping varies from two to twenty-four hours, preferably six to twelve hours per batch.

For stripping in a batch process, the feed is charged to a batch reactor and pressured with $H_2$ or $N_2$ to reaction pressure while stirring. After three minutes of stirring the pressure is released. In this way oxygen containing gases are stripped from the reactor. Good success has been had by repeating this procedure five to six times. In any case the resin solution is submitted to a continuous hydrogenation process for a time sufficient to yield a low-colored resin.

Suitable solvents for use in the hydrogenation step include n-hexane and its various isomers, n-heptane, and the like.

Suitable hydrogenation catalysts include metals of groups VI and VIII of the periodic table, e.g. nickel, palladium, platinum, nickel sulfides, copper chromite, cobalt molybdate, etc. which may be supported on light porous or other granular particles such as alumina, pumice, clay, charcoal, etc.

The hydrogenation is effected under a pressure of about 100 to 5000 p.s.i.g., preferably about 500 to 3000 p.s.i.g., at temperatures of 100 to 750° F., preferably about 300 to 500° F. It may be conducted in a continuous process under a hydrogen flow rate of about 100 to 2000 standard cubic feet per barrel of resin with a liquid feed rate of 0.1 to 5, preferably 0.3 to 2 v./v./hr., i.e. volumes of liquid feed per volume of catalyst per hour. Alternately, the hydrogenation may take place in a batch process, maintaining a $H_2$ pressure of 500 to 3000 p.s.i.g. and a resin/catalyst ratio of 1/1 to 300/1, preferably 10/1 to 50/1.

The concentration of the resin solution submitted to hydrogenation has an important effect on the rate and extent of color removal at equivalent amounts of catalyst. At too high a concentration, viscosity prevents good catalyst contacting. Too low a concentration is uneconomical. It has been found that a concentration of 50 wt. percent resin in solvent is the maximum concentration that can be tolerated without large sacrifice in rate. A range of 20 to 50 wt. percent resin in solvent is suitable with about 20 wt. percent preferred.

The advantages and details of the invention will be better understood from the following specific examples.

Example 1

The feed or raw material which was subjected to polymerization was made by steam-cracking a gas oil petroleum fraction derived from a paraffinic type crude, the cracking being carried out at a temperature of about 1300 to 1450° F. and pressure of 5 to 20 p.s.i.g. in the presence of about 70 to 80 mol percent of steam.

The approximate analysis of the resultant steam-cracked fraction, after debutanizing, was as follows:

| | Volume percent |
|---|---|
| $C_5$ cyclodiolefins | 5 |
| Aliphatic $C_5$ diolefins | 5 |
| $C_5$ olefins | 20–21 |
| $C_6$–$C_8$ diolefins | 8–10 |
| $C_6$–$C_8$ olefins | 14–15 |
| $C_9$–$C_{12}$ diolefins | 3 |
| $C_9$–$C_{12}$ olefins | 4 |
| Benzene | 15 |
| Toluene | 10 |
| Xylenes | 2–3 |
| $C_9$–$C_{12}$ aromatics | 5–6 |
| Paraffins | 3 |

The above steam-cracked fraction was subjected to heat soaking and distillation to remove pentenes, isoprene, and cyclodienes to produce a feedstock with this approximate analysis:

| | Volume percent |
|---|---|
| Pentenes | 4 |
| Isoprene | 2 |
| Piperylenes | 8 |
| Acetylenes | 1 |
| Cyclodienes | 2 |
| Benzene | 40 |
| Toluene | 10 |
| $C_6$–$C_8$ diolefins | 13 |
| $C_6$–$C_8$ olefins | 20 |

The product was then subjected to Friedel-Crafts batch polymerization at a temperature of 90 to 120° F. for a residence time of one hour with 1 wt. percent $AlCl_3$ catalyst based on feed. The polymerization was terminated by the addition of a 2:1 mixture, by volume, of water to isopropyl alcohol. Inorganic halides resulting from catalyst decomposition were then removed from the resin solution by washing successively with warm water. The resulting resin solution was stripped under 3–5 mm. Hg to a maximum bottoms temperature of 520° F. to recover the resin product. While still hot the resin bottoms was blended back to a 65% concentration with a hydrocarbon solvent boiling between 150 and 350° F. This is standard commercial procedure to produce a final resin concentrate which is liquid at room temperature for easy handling.

Example 2

The resin concentrate from Example 1 was further diluted with heptane to a 20 wt. percent resin concentration and heated to reaction temperature of 400° F. in the absence of catalyst and hydrogen and the effect of nitrogen stripping—prior to preheating—on color body formation during preheat of the reaction mixture was determined. In the first experiment no stripping was employed. In the second experiment the 20% total resin solution was stripped with $N_2$. In the third experiment the 65% resin solution and the heptane solvent required to make the final 20% solution were stirpped separately. Color readings obtained during the preheating of the three samples were obtained by photoelectric measurements and are given below in terms of ratios of the product/feed color.

| Temp., °C. | Ratio of Color Bodies during Preheat Product/Feed | | |
|---|---|---|---|
| | 1st Sample | 2d Sample | 3d Sample |
| 36 | 1.0 | 1.0 | 1.0 |
| 87 | 1.1 | 1.0 | 1.0 |
| 160 | 1.8 | 1.6 | 1.2 |
| 204 | 3.6 | 2.1 | 1.5 |

The data show that if no nitrogen flushing is employed the color body concentration increases over three-fold during the preheat step with the corresponding greater load on catalyst activity. By comparison, color body concentration increases only 50 to 110% if prior $N_2$ stripping is employed. The best results are obtained if the solvent and resin concentrate (65 wt. percent) are stripped separately. Under these conditions the hydrogenation feed is virtually color stable and therefore when subsequently hydrogenated, maximum color reduction is obtained.

The advantages of the present invention having thus been fully set forth and specific examples of the same given, what is claimed as new and useful and desired to be secured by Letters Patent is:

1. An improved continuous process for preparing a substantially water-white petroleum resin from a steam-cracked naptha fraction boiling between about 50 to 450° F. having the following composition:

| | Parts by weight |
|---|---|
| Benzene | 5–20 |
| Toluene | 5–15 |
| $C_9$–$C_{12}$ aromatic hydrocarbons | 0–25 |
| Cyclic diolefins | 5–15 |
| Aliphatic diolefins | 10–15 |
| Aliphatic mono-olefins | 15–60 |
| Paraffins | 0–5 | which comprises subjecting said fraction to polymerization in the presence of a Friedel-Crafts catalyst at a temperature between −150 and +200° F. to polymerize the resin-forming constituents, and form a solution of resin in non-resin-forming constituents, separating the resin from the non-resin-forming constituents, dissolving the resin in a hydrocarbon solvent, stripping the solution with an inert gas saturated with the solvent for a period of two to twenty-four hours, preheating said resin solution to reaction temperature in the absence of a catalyst and hydrogenating said preheated solution under pressure at said temperature in the presence of a hydrogenation catalyst to obtain a hydrogenated resin solution, and stripping said solution at an elevated temperature and reduced pressure to produce a substantially water-white resin.

2. An improved continuous process for preparing a substantially water-white petroleum resin from a steam-cracked naphtha fraction boiling between about 50 and 450° F. having the following composition:

| | Parts by weight |
|---|---|
| Benzene | 5-20 |
| Toluene | 5-15 |
| $C_9$-$C_{12}$ aromatic hydrocarbons | 0-25 |
| Cyclic diolefins | 5-15 |
| Aliphatic diolefins | 10-15 |
| Aliphatic mono-olefins | 15-60 |
| Paraffins | 0-5 | which comprises subjecting said fraction to polymerization in the presence of a Friedel-Crafts catalyst at a temperature between −150° and +200° F. to polymerize the resin-forming constituents, and form a solution of resin in non-resin-forming constituents, separating the resin from the non-resin-forming constituents, providing a hydrocarbon solvent, stripping the hydrocarbon solvent with an inert gas saturated with the solvent for a period of two to twenty-four hours, dissolving the resin in unstripped solvent to prepare a resin solution more concentrated than desired for hydrogenation, stripping the resin concentrate with an inert gas saturated with the solvent for a period of two to twenty-four hours, diluting the stripped resin concentrate with the stripped solvent, preheating said resin solution to reaction temperature in the absence of a catalyst and hydrogenating said preheated solution under pressure at said temperature in the presence of a hydrogenation catalyst to obtain a hydrogenated resin solution, and stripping said solution at an elevated temperature and reduced pressure to produce a substantially water-white resin.

3. An improved batch process for preparing a substantially water-white petroleum resin from a steam-cracked naphtha fraction boiling between about 50 to 450° F. having the following composition:

| | Parts by weight |
|---|---|
| Benzene | 5-20 |
| Toluene | 5-15 |
| $C_9$-$C_{12}$ aromatic hydrocarbons | 0-25 |
| Cyclic diolefins | 5-15 |
| Aliphatic diolefins | 10-15 |
| Aliphatic mono-olefins | 15-60 |
| Paraffins | 0-5 | which comprises subjecting said fraction to polymerization in the presence of a Friedel-Crafts catalyst at a temperature between −150 and +200° F. to polymerize the resin-forming constituents, and form a solution of resin in non-resin-forming constituents, separating the resin from the non-resin-formnig constituents, dissolving the resin in a hydrocarbon solvent, charging the resulting solution to a batch reactor and stripping said solution by introducing an inert gas under pressure into said reactor while stirring, releasing said pressure after three minutes and repeating said procedure at least five times, preheating said resin solution in the absence of a catalyst to reaction temperature and hydrogenating said preheated solution under pressure at said temperature in the presence of a hydrogenation catalyst to obtain a hydrogenated resin resolution, and stripping said solution at an elevated temperature and reduced pressure to produce a substantially water-white resin.

References Cited
UNITED STATES PATENTS

| | | | |
|---|---|---|---|
| 2,836,581 | 5/1958 | Gordon | 260—82 |
| 2,911,395 | 11/1959 | Small | 260—82 |
| 2,963,467 | 12/1960 | Small | 260—82 |
| 3,040,009 | 6/1962 | Wadsworth et al. | 260—82 |

JAMES A. SEIDLECK, *Primary Examiner.*